Feb. 14, 1939.  E. S. CORNELL, JR  2,147,244
INTEGRAL WROUGHT METAL VALVE BODY
Filed March 22, 1935
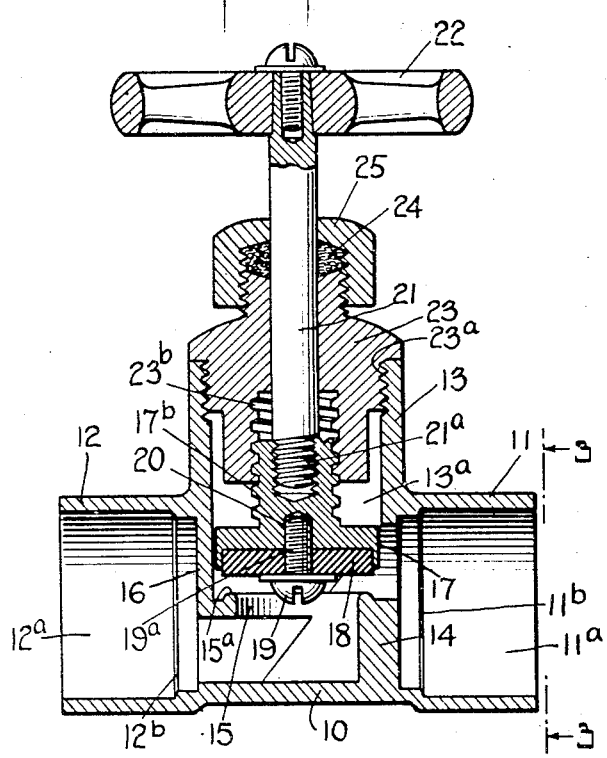
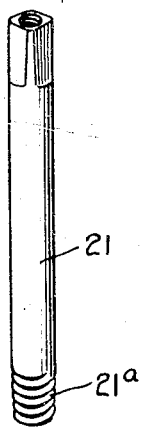
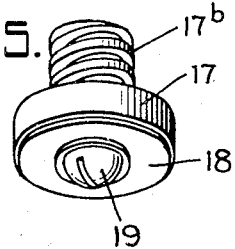
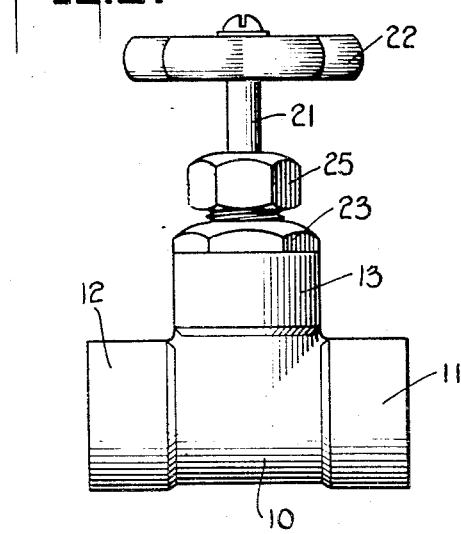
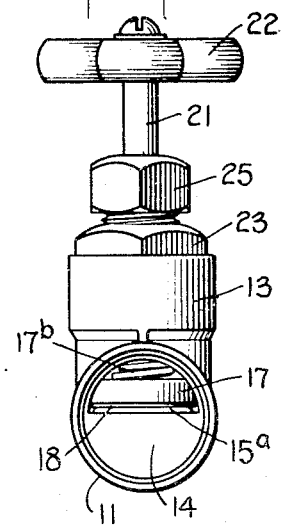
INVENTOR
Edward S. Cornell, Jr.
BY
HIS ATTORNEY Patented Feb. 14, 1939

2,147,244

UNITED STATES PATENT OFFICE 2,147,244

INTEGRAL WROUGHT METAL VALVE BODY

Edward S. Cornell, Jr., Larchmont, N. Y., assignor to American Radiator Company, New York, N. Y., a corporation of New Jersey Application March 22, 1935, Serial No. 12,378

3 Claims. (Cl. 251—158)

My invention relates to valve bodies of integral wrought metal, preferably of high copper content.

Pursuant to my invention, the body of the valve comprises a body proper, end portions of the body, and a lateral for receiving, securing and housing the movable valve mechanism, wall members disposed within the body proper providing for a passage therethrough and serving as the seat or for the support of a seat for the movable valve member, the body proper and the end portions and the wall of the lateral and the stated wall members being individually integral and integral with one another without joint and wrought to final status by cold working.

Preferred embodiments of my invention are formed of copper or of copper alloy of predominant copper content, that is to say, embodying copper in such proportion that the supply of heat effects the formation of cuprous and/or other oxides, and other deleterous conditions, defeating the purposes of the present invention.

Embodiments of my invention may be of the sweated joint connection type, that is to say, the end portion or portions provided with a face which is substantially smooth throughout and of substantially uniform diameter, dimensioned with respect to the diameter of the end of a pipe or of another pipe fitting when in telescoped relation to such smooth face to provide a clearance of a magnitude to effect capillary and/or surface flow of the bonding medium when applied in fused status during the stage of assembly, which upon congealing, forms a rigid joint therewith.

Embodiments of my invention may be provided at both or either end portion with threading for receiving in telescoped relation therewith the threaded end of a pipe or of another pipe fitting.

The wall thickness of the end portions may be selected as desired; for sweated joint connection, the wall thickness may be of reduced magnitude inclusive of a thickness incapable of bearing a substantial thread or the wall thickness may be increased to provide for threading comparable to threading of so-called iron piping.

Further features and objects of the invention will be more fully understood from the following detail description and the accompanying drawing, in which Fig. 1 is a central vertical section of a preferred form of my invention, illustrating a sweat jointed type of connection.

Fig. 2 is a side elevation of Fig. 1, on a somewhat reduced scale.

Fig. 3 is an end elevation of Fig. 1, on line 3—3.

Fig. 4 is a side elevation of a preferred form of stem of the movable valve member.

Fig. 5 is a perspective view of a movable valve member associated with the stem shown in Fig. 4.

Referring to the preferred embodiments shown in the drawing, the valve body comprises the body proper 10, an end portion 11, its opening 11a communicating with the passage of the body proper 10; also the end portion 12, the opening 12a of which communicates with the passage of the body proper 10. The valve body further comprises the lateral 13, the opening 13a of which communicates with the passage of the body proper 10.

The valve body further comprises the wall members 14, 15, 16, etc., extending integrally and without joint from the valve body, conveniently from the walls of the body proper 10, such wall members including a portion, say the portion indicated by the reference number 15, serving as a seat or for the support of a seat for a movable valve member.

As shown in Fig. 1, the valve seat 15 extends substantially parallel to a line passing through the mean axes of the end openings 11a, 12a. Such valve seat 15, as shown, may have its effective face extending substantially in alignment with a line coinciding with the mean axes of the end openings 11a, 12a.

In the types of my invention wherein the valve seat 15 is parallel to a line coinciding with the mean axes of the end openings 11a, 12a, as is illustrated in the drawing, the walls of the lateral 13 extend substantially at right angle to such axes-connecting line, to provide a corresponding path of movement of the movable valve member, and in particular to effect a closing position of the movable valve member, under pressure substantially normal to the effective face of the valve seat.

The movable valve member and its assembly may be elected as desired, the length and wall thickness of the lateral opening being dimensioned corresponding to the selected movable valve member assembly.

Such arrangement provides for a passage through the body proper communicating respectively with the passages 11a, 12a afforded by the end portions 11, 12, which passage is effectively opened upon movement of the movable valve member to the desired extent from the valve seat, and is closed upon movement of the movable valve member in pressure engagement with the valve seat.

The characteristics of my invention in the above stated assembly reside in the formation of the body proper, the end portions, the lateral portion and the wall members defining the passage through the body proper and serving as or for the support of the valve seat, each of integral metal without joint, and integrally connected to one another.

My invention is of especial advantage in the formation of the above stated valve body of copper or of copper alloy of predominant copper content, the above stated essential parts being formed by cold operation, such as forming, swaging, drawing, heading, extruding, and the like, in the absence of supplied heat, and under the condition of obviating engendering of elevated temperature capable of forming oxides or other deleterient. For the purpose of the present invention, the valve body may be formed of a length, preferably hollow, of proper cubical content of metal and the stated parts respectively formed by the stated cold operations and save for finishing operations wrought to their respective final status.

As above indicated, the particular embodiment illustrated in the drawing is of the sweated joint type, that is to say, the inner wall of each of the end members 11, 12 is substantially smooth and of a substantially uniform diameter, the diameter being selected to provide for a clearance of suitable magnitude for effecting such joint. The area of such smooth face is predetermined as by means of a shoulder or equivalent stop means for gauging and predetermining the extent of insertion of the end of a pipe or of another pipe fitting. 11b indicates the stop means of the end opening 11, and 12b indicates the stop means of the end opening 12.

A convenient type of movable valve member assembly, and as illustrated in the drawing, comprises a movable valve member 17, desirably including a renewable washer 18, shown removably positioned by means of a screw 19, its threaded end 19a being received within a threaded drill opening 20; the movable valve member 17 may be mounted and secured on a stem member 21 by any suitable means, such as threaded connection therewith, its threaded end 21a being received and secured within the internally threaded opening 17a. Any suitable type of hand or other manipulating member 22 may be secured to the exterior end of the stem 21, as by screw and threaded drill opening as indicated. The stem 21 passes through a central perforation of a bonnet member 23, secured by its external threading 23a to the cylindrical wall of the lateral or lateral opening 13, preferably internally thereof, as shown.

The valve is operated upon rotative movement of the manipulating member 22 and the stem 21 by the provision of the threading 23b internally of a lower opening formed in the bonnet and of a diameter appreciably greater than that of the stem 21, the threading 23b meshing with the threading 17b of like characteristics formed on the exterior of the upper, reduced portion of the movable valve member 17. The threading 17b and 23b are preferably of high pitch and relatively large meshing area. A conventional gland 24 and gland nut 25 may be employed, as shown.

In the embodiment shown in the drawing, the lateral has its axis of opening substantially normal to a line coincident with the axes of the openings 11a, 12a. However, the axis of the opening of the lateral may be at any desired angle to the axes of the end portions of the valve body. Upon determination of the angle of the axis of the opening of the lateral, the direction of extension of the wall of the lateral is determined and also the plane or direction of extension of the wall member 15 within the body serving as the seat or for the support of the seat for the movable valve member.

The formation of the lateral, inclusive of its wall and direction of extension of the axis of its opening, and the formation of the wall members within the valve, inclusive of the wall member and/or portion thereof serving as the seat or for the support of the seat of the movable valve member, and providing for the passage through the valve body during the stages of open position of the movable valve member, may be carried out by means of the principles of cold operation of the metal set forth in my copending application, Serial #12,377, filed March 22, 1935, and entitled Method of producing integral wrought valve bodies, employing suitably headed punches or male dies at the proper stages to provide for the preservation of integrity of the inner wall members 14, 15, 16, etc., and also for the passage respectively adjacent the inner wall members and through the wall member serving as or for the support of the valve seat. The relative thicknesses and positions and contours of the wall members may be varied as preferred.

The valve seat is shown in the drawing in the form of a raised rounded circular or annular portion 15a, formed by suitably drilling, gauging, milling, etc., the stated part, access being afforded through the opening of the lateral 13, as well as through the openings 11a, 12a, of the respective ends.

The length and wall contour and thickness of the lateral may be as preferred. My invention provides for a cubical content of the lateral represented by its length and mean wall thickness up to any desired value; for rigidity of connection of the assembly of the movable valve member comparable to commercial requirements of rigidity connection by screw thread or other telescoped connection with an end of a pipe or the like, I recommend a minimum cubical content of the wall of the lateral appreciably greater than the cubical content of the zone defined at its outer boundary by the outer periphery of the lateral and having a wall thickness equal to that of the body proper.

If preferred, a removable valve seat may be employed, the effective face of the wall portion 15a being conformed accordingly, with provision of means for the securement of such removable valve seat.

As appears from the above, and from the disclosure of my aforesaid copending application Ser. #12,377, my cold wrought metal valve body has walls formed by cold working; further, that the walls of the body end openings have inner faces of substantially uniform diameter, which faces respectively extend from the outer termini of the body end openings to a shoulder, the latter disposed closely adjacent to the seat wall formation within the body proper of the valve body. By such construction, my valve body is particularly adapted for sweat jointed connection with an end of a pipe or the like. For sweat jointed connection, it is advantageous, as is provided for pursuant to my invention, that the thickness of the walls of the body end openings be substantially uniform.

Further, my valve body provides for substantially uniform bore within the end openings, advantageous for both sweat jointed connection and threaded connection with an end of a pipe or the like.

Whereas I have described my invention by reference to specific forms thereof, it will be understood that many changes and modifications may be made without departing from the spirit of the invention, as by varied diameters of effective opening of the end portions respectively, varied cross-sectional area of opening of the lateral, varied uniform wall thicknesses and varied non-uniform wall contours of the respective body proper, end portions and the lateral, and the like.

I claim:

1. A valve body of wholly integral cold wrought metal of predominant copper content, comprising a body proper, end portions having passages for affording connection with the ends of a pipe or other pipe fitting, a lateral having a passage, said end portions being respectively integral with said body proper and devoid of joint and wrought to final status by cold operation, said lateral being integral with said body proper and devoid of joint and wrought to final status by cold operation, and wall members defining in whole or in part a passage through said body proper, said wall members having faces serving as or for the support of a seat for a movable valve member, said wall members and said body proper being integral with one another and devoid of joint and wrought to final status by cold operation, the passages of said end portions and the passage of said lateral respectively communicating with said passage of said body proper, said lateral being arranged for mounting a movable valve member therein.

2. A valve body of wholly integral cold wrought metal of predominant copper content, comprising a body proper, end portions having passages for affording connection with the ends of a pipe or other pipe fitting, each of said end passages having a smooth face of uniform diameter, the metal of the wall of each of said end openings being formed as a shoulder for predetermining the area of said uniform diametered smooth face, a lateral having a passage, said end portions being respectively integral with said body proper and devoid of joint and wrought to final status by cold operation, said lateral being integral with said body proper and devoid of joint and wrought to final status by cold operation, and wall members defining in whole or in part a passage through said body proper, said wall members having faces serving as or for the support of a seat for a movable valve member, said wall members and said body proper being integral with one another and devoid of joint and wrought to final status by cold operation, the passages of said end portions and the passage of said lateral respectively communicating with said passage of said body proper, said lateral being arranged for mounting a movable valve member therein.

3. A valve body of wholly integral cold wrought metal of predominant copper content, comprising a body proper, end portions having passages for affording connection with the ends of a pipe or other pipe fitting, each of said end passages having a smooth face of uniform diameter, the metal of the wall of each of said end openings being formed as a shoulder for predetermining the area of said uniform diametered smooth face, the diameters of said passages of said end portions being substantially equal to one another, a lateral having a passage, said end portions being respectively integral with said body proper and devoid of joint and wrought to final status by cold operation, said lateral being integral with said body proper and devoid of joint and wrought to final status by cold operation, and wall members defining in whole or in part a passage through said body proper, said wall members having faces serving as or for the support of a seat for a movable valve member, said wall members and said body proper being integral with one another and devoid of joint and wrought to final status by cold operation, the passages of said end portions and the passage of said lateral respectively communicating with said passage of said body proper, said lateral being arranged for mounting a movable valve member therein.

EDWARD S. CORNELL, Jr.